United States Patent Office 3,214,418
Patented Oct. 26, 1965

3,214,418
BORON NITRIDE-ALKALI METAL COMPOUNDS AS POLYMERIZATION CATALYST
Herbert R. Anderson, Jr., Yorktown Heights, N.Y., assignor to Phillips Petroleum Company, a corporation of Delaware
No Drawing. Filed Sept. 18, 1961, Ser. No. 138,571
12 Claims. (Cl. 260—94.2)

This invention relates to synthetic rubber. In particular, this invention relates to a novel catalytic polymerization of conjugated dienes.

This application is a continuation-in-part of my copending application having Serial No. 696,919, filed November 18, 1957, now abandoned.

Various methods are described in the literature for polymerizing conjugated dienes, particularly 1,3-butadiene, including emulsion polymerization, alkali metal-catalyzed polymerization, and alfin-catalyzed polymerization. Emulsion polymerization of 1,3-butadiene gives a polymer with from about 60 to about 80 percent trans 1,4-addition, from about 5 to about 20 percent cis 1,4-addition, and from about 15 to about 20 percent 1,2-addition. Sodium-catalyzed polybutadiene has from about 60 to about 75 percent 1,2-addition, the remainder being cis and trans 1,4-addition. Alfin-catalyzed polybutadiene has from about 65 to 75 percent trans 1,4-addition, from 5 to about 10 percent cis 1,4-addition, and from about 20 to about 25 percent 1,2-addition. For a more complete discussion of the configuration of polybutadiene, reference is made to an article by J. L. Binder appearing in Industrial and Engineering Chemistry, volume 46, 1727 (August 1954).

These various addition products are termed synthetic rubbers. These rubbers have many uses, such as tire carcasses, tread stock, inner tubes, various molded articles such as rubber gloves, toys, etc., rubber pipe and tubing and the like. These rubbers have various properties depending upon the monomer employed, polymeric configuration, and polymerization conditions. For example, polymer of cis 1,4-addition generally more closely resemble natural rubber than do the trans 1,4-addition products or the 3,4- or 1,2-addition products. For some purposes, therefore, it is desired to hold the cis 1,4-addition product to a minimum.

It is an object of this invention to provide a novel catalyst system for polymerizing conjugated dienes.

It is another object of this invention to provide a novel process for preparing polymers of isoprene having a very small amount of cis 1,4-addition product.

Other objects, features and advantages of this invention will be obvious to those skilled in the art having been given disclosure.

According to this invention, a conjugated diene is contacted under polymerization conditions with a reaction compound of boron nitride and an alkali metal selected from the group consisting of sodium, potassium, rubidium and cesium to form a polymer of said conjugated diene. The boron nitride alkali metal compound can be employed alone or in junction with a Group IV metal compound, particularly the halides and various oxygenated derivatives such as alkoxide of said Group IV metal.

Air is excluded during preparation and storage of the boron nitride-alkali metal compounds. One method which can be employed for the preparation of these compounds, sometimes referred to as alloys, involves reaction of vaporized alkali metal with the boron nitride under conditions suitable to effect the reaction. In this method a reactor system, frequently constructed of glass, is provided which contains separate compartment for charging the boron nitride and alkali metal, separate heating means for each compartment, and a means for evacuating the system while heating the boron nitride. After heating the boron nitride and evacuating the system to remove all volatile materials, the reactor is sealed and placed in a vertical position with the compartment containing the boron nitride below that containing the alkali metal. Upon heating the upper compartment under suitable conditions, the alkali metal is melted and transferred to the lower chamber with the boron nitride. The chamber is sealed and the reactants heated to effect reaction between the boron nitride and alkali metal.

Heating of the boron nitride while the system is being evacuated is generally effected at a temperature in the range between 100 and 600° C. if a glass vessel is used. Higher temperatures can be used with other types of vessels. The time of heating and evacuation will depend upon the temperature. It will generally be in the range between one and 40 hours. Obviously the higher the temperature employed, the shorter the time required for the degassing operation.

The step which involves transfer of the alkali metal to the compartment containing boron nitride is generally operated at a temperature in the range between 100 and 600° C. The time required for transfer of the alkali metal will depend upon the temperature and will generally be in the range between 10 minutes and 100 hours, preferably between 10 and 50 hours. Temperatures in excess of 200° C. are preferred in this step in order to build up a higher vapor pressure of alkali metal and aid its transfer to the compartment containing boron nitride.

The reaction between the alkali metal and boron nitride is effected at a temperature generally in the range between 375 and 600° and will depend upon the stability of the product.

The boron nitride-alkali metal compounds employed in this invention generally contain boron nitride in the range between 2 and 16 moles per mole of alkali metal although amounts outside this range may be used. The product formed is governed, at least in part, by the quantities of boron nitride and alkali metal charged. Alkali metals employed are sodium, potassium, rubidium, and cesium. The products are protected from the air during storage and use.

When the boron nitride-alkali metal compounds are to be used as polymerization catalysts, one convenient method for protecting them from air is to coat them with an inert, relatively low melting material such as petrolatum.

As hereinbefore stated, the boron nitride-alkali metal compounds can be employed alone as polymerization catalysts or in conjunction with Group IV metal compounds, i.e., compounds of titanium, silicon, thorium, zirconium, tin, lead, hafnium, germanium, and cerium. Compounds of these metals which are applicable can be represented by the formula $X_nM(OR)_m$, wherein X is a halogen, M is a Group IV metal, R is a member selected from the group consisting of alkyl, aryl, cycloalkyl, alkaryl, aralkyl, alkenyl, cycloalkenyl, and acyl radicals, $m$ and $n$ are integers from 0 to 4, inclusive, and $m+n$ equals the valence of the metal, i.e., 2, 3 or 4. Each R contains not more than 20 carbon atoms, preferably less than 10 carbon atoms, with the total carbon atoms in the complex compound not exceeding 50. Examples of these compounds include the di-, tri- and tetrahalides of the Group IV metals and oxygenated compounds such as tetra-n-butyl titanate, tetraisopropyl titanate, tetra-m-tolyl titanate, tetraallyl titanate, tetracyclohexenyl titanate, tetraethyl zirconate, tetraamyl zirconate, tetramethyl hafnate, titanium acetate, zirconium butoxide, zirconium propionate, thorium benzoate, and the like. Mixtures of two or more of the aforementioned materials can be used in the catalyst compositions of this invention. Of particular interest are the halides, chlorides, bromides, iodides and fluorides of the group IV metals, especially the tetrahalides such as titanium tetrachloride, zirconium tetrabromide, thorium tetraiodide and lead tetrafluoride.

When Group IV metal compounds are employed in catalyst compositions with boron nitride-alkali metal compounds, the amount used will generally be in the range between zero and 10 moles per mole of the boron nitride-alkali metal compound.

The amount of total catalyst composition used in polymerization reactions can vary over a wide range depending upon several factors including the particular catalyst system employed, the monomeric material, the polymerization temperature, etc. The amount of total catalyst composition will usually be in the range between 0.01 and 15.0 weight percent, based on the amount of monomeric material charged to the polymerization reactor.

Conjugated dienes polymerized in accordance with the process of this invention include those compounds which contain from 4 to 12, inclusive, carbon atoms per molecule. Examples of conjugated dienes which can be used include 1,3-butadiene, 2-methyl-1,3-butadiene (isoprene), 2,3 - dimethyl - 1,3-butadiene, 2-methoxy-1,3-butadiene, 2-ethoxy-3-ethyl-1,3-butadiene, 2-methyl-1,3-pentadiene, 1,3 - pentadiene, 2,3 - dimethyl-1,3-pentadiene, 2-methyl-3-ethyl-1,3-pentadiene, 2-methoxy-1,3-butadiene, 2-phenyl-1,3-butadiene, 2,3-diethyl-1,3-octadiene, and the like.

This invention is applicable to the polymerization of the above-identified conjugated dienes either alone or in admixture with each other and/or with minor amounts of one or more other compounds containing an active $CH_2=<$ group which are copolymerizable therewith. Preferably the conjugated diene comprises at least 70 weight percent of the total monomer charged since such compounds are rubbery in nature.

Representative monomers copolymerizable with the conjugated dienes include aryl olefins, such as styrene, various alkyl styrenes, p-chlorostyrene, p-methoxystyrene, alpha-methylstyrene, vinylnaphthalene and similar derivatives thereof and the like, acrylic and substituted acrylic acids and their esters, nitriles and amides such as acrylic acid, methylacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide, and the like, methyl isopropenyl ketone, methyl vinyl ketone, methyl vinyl ether, vinyl ethynyl alkyl carbinols, vinyl acetate, vinyl chloride, vinylidene choloride, vinylfuran, vinylcarbazole, vinylacetylene, vinyl-substituted heterocyclic compounds such as 2-vinylpyridine, 2-methyl-5-vinylpyridine, 2-vinylquinoline, and the like, and the unsaturated hydrocarbons, esters, alcohols, acids, ethers, heterocyclics, etc. of the type described. The art is familiar with such copolymerizable monomers.

It is preferred that the present process be operated in the presence of diluents. Materials suitable for this purpose are hydrocarbons which are not detrimental to the polymerization reaction and which are liquid under conditions of the process. Suitable diluents include propane, n-butane, isobutane, n-pentane, isopentane, n-hexane, isohexane, n-heptane, 2,2,4-trimethylpentane, n-decane, cyclohexane, methylcyclohexane, benzene, toluene, xylene, ethylbenzene, and mixtures thereof. In general, the total carbon atoms per molecule of such diluent will not exceed about 10.

Polymerization temperature is generally in the range between —20° and 150° C., preferably between —5° and 80° C.

Products prepared using the catalyst of this invention range from rubbery to resinous, depending upon the catalyst systems, monomers, reaction conditions, and the like.

I have found that when polymerizing isoprene, only a small amount of cis-1,4 polymer is formed and for that reason I will illustrate my invention using that monomer.

*Example I*

A dumbbell type of glass vessel having two compartments prepared from 15 mm. tubing, each approximately 5 inches long, connected with a capillary tube 3 mm. in diameter, was provided. A spherical glass bulb or break seal approximately 0.5 cm. in diameter, which could withstand evacuation but could be broken easily with a sharp instrument, was attached to one end. The break seal was encased in a 15 mm. tube which was connected to an 8 mm. tube. A side arm for introduction of boron nitride was attached to the side of the same compartment. An 8 mm. tube leading to a high vacuum system was connected to the opposite dumbbell compartment.

Materials charged to the reactor for the production of a boron nitride-potassium catalyst were as follows:

Boron nitride, grams _____(0.2 mole)__ 5.05
Potassium, grams _____(0.05 mole)__ 2.0
Boron nitride/K mole ratio _____ 4/1

The boron nitride was pressed into small pellets and introduced through the side arm into the dumbbell compartment provided with the break seal. The side arm was then sealed. Potassium, prepared in a special manner as hereinafter described, was introduced into the other dumbbell compartment.

Potassium was prepared in a manner such that it was protected from air oxidation. It was melted under a helium blanket and drawn into small bore glass tubes. The weight of potassium per unit length of tube could be calculated from the total weight. Short lengths of the tube containing potassium were charged to the dumbbell compartment until the desired amount had been introduced.

The glass vessel, containing boron nitride in one compartment and potassium in the other, was connected to a high vacuum system and, at the same time, the dumbbell compartment containing the boron nitride was heated to 500° C. This operation was continued for 16 hours. This process expels oxygen and other volatile impurities from the system.

The tube leading to the high vacuum system was sealed and the glass vessel was placed in a vertical position with the potassium chamber at the top. The potassium chamber and capillary tube were heated at 500° C. for 24 hours during which time the potassium was melted and transferred to the boron nitride chamber. The capillary tube connector between the chambers was then sealed and the chamber containing the reactants was then heated at 500° C. for 16 hours.

A funnel was attached to the 8 mm. tube next to the break seal and liquid petrolatum was introduced. The seal was broken to allow the liquid petrolatum to flow over the catalyst and form a protective coating. The protected catalyst composition was removed by breaking the tube. From the weight of the original catalyst (boron nitride and potassium charged) and the total weight of the composition containing the petrolatum, the concentration of active catalyst in petrolatum could be calculated. In this case it was 23.9 weight percent. The total composition was heated to melt the petrolatum and the mixture was stirred to insure a uniform dispersion of the boron nitride-potassium catalyst in the petrolatum.

Two runs were made for the polymerization of isoprene using the boron nitride-potassium catalyst. Seven-ounce bottles were used as reactors. The catalyst for each run was weighed and pressed against the inside of the neck of the bottle. A 50/50 mixture by weight of isoprene in n-heptane, previously stored over anhydrous calcium sulfate for one week, was introduced, care being taken not to allow this material to come in contact with the catalyst. (The isoprene was distilled prior to being mixed with n-heptane.) The bottles were purged with prepurified nitrogen which expelled air from the reactors and removed moisture from monomer and diluent. The bottles were capped and agitated by rotation in a bath at 30° C. for 16 hours. The polymers were recovered by precipitation with isopropyl alcohol and dried in a vacuum oven at 50° C. for 24 hours. The products were soft rubbers.

A control run was made using a potassium dispersion in petrolatum as the catalyst. A 16 weight percent dispersion of potassium in petrolatum was prepared. The petrolatum was charged to a creased flask provided with a high speed stirrer and heated until melted. Potassium was added and the mixture stirred to give a homogeneous composition. During the stirring operation the temperature was maintained just high enough to keep both the potassium and the petrolatum in the molten state. The polymerization run using the potassium catalyst was made in a manner similar to the runs using the boron nitride-potassium catalysts.

The quantities of materials charged in each polymerization and the results obtained were as follows:

|  | Polymerization Runs | | |
|---|---|---|---|
|  | A | B | C |
| Iosprene, grams | 40 | 40 | 40 |
| n-Heptane, grams | 40 | 40 | 40 |
| Boron nitride-K catalyst, grams [1] | 0.435 | 0.870 |  |
| Weight K in catalyst charged, grams | 0.123 | 0.246 |  |
| Potassium catalyst, grams [2] |  |  | 0.123 |
| Polymerization temperature, °C | 30 | 30 | 23–25 |
| Polymerization time, hours | 16 | 16 | 16 |
| Conversion, percent | 6 | 6 | 95 |
| Inherent viscosity of polymer | [3] | 1.37 | 0.82 |
| Gel, percent | [3] | 0 | 0 |
| Infrared examination: |  |  |  |
| 3,4-addition, percent | [3] | 18 | 47 |
| Trans 1,4-addition, percent | [3] | [3] | 28 |
| 1,2-addition, percent | [3] | 5 | 7 |

[1] Charged as 23.9 percent dispersion in petrolatum.
[2] Charged as 16 per cent dispersion in petrolatum.
[3] Not determined.

Infrared examination of the polymers showed no evidence of cis 1,4-addition in products from Runs A and B. There was a shift in the trans band in the polymer from Run C which indicated the possibility of a significant amount of cis 1,4-addition polymer.

*Example II*

The procedure of Example I was employed for the preparation of a boron nitride-potassium catalyst. Amounts of materials charged and operating conditions were as follows:

Boron nitride, pressed into pellets,
  grams _____ 5.0 (0.2 moles).
Potassium, grams _____ 2.04 (0.05 moles).
Boron nitride/K mole ratio ____ 4/1.
Evacuation of system _____ 20 hours at 400° C.
Transfer of K to boron nitride
  chamber _____ 24 hours at 450° C.
Reaction _____ [1] 24 hours at 150° C.

[1] After heating the reactants for 24 hours at 150° C., the temperature was raised to 250° C. for 24 hours and then to 400° C. for 24 hours.

The mixture was cooled to 250° C. and then very slowly to room temperature. Molten petrolatum was then added as in Example I. The product obtained was a bluish-black. Particles of the boron nitride-potassium compound were physically separated from the mixture, which contained unreacted potassium, while the mixture was still molten. The compound which was removed, together with some of the petrolatum, was ground in a mortar and the resulting composition was used for the polymerization of isoprene as described in Example I.

The quantities of materials charged in the polymerization run and the results obtained were as follows:

Isopreme, grams _____ 40
n-Heptane, grams _____ 40
Boron nitride-K catalyst, grams _____ 2.8
Polymerization temperature, °C. _____ [1] 50
Time, hours _____ [1] 72

[1] The temperature was 50° C. for 72 hours and polymerization was continued for 48 hours at 30° C.

The polymer was recovered by precipitation with isopropyl alcohol and dried in a vacuum oven at 50° C. for 24 hours. The product was a soft rubber. Infrared examination gave the following results:

3,4-addition, percent _____ 18
Trans 1,4-addition, percent _____ 25
1,2-addition, percent _____ 5

No cis 1,4-addition product could be identified.

It will be evident to those skilled in the art that many variations and modifications can be practiced upon consideration of the foregoing disclosure. Such variations and modifications are believed to be within the spirit and scope of the present invention.

I claim:
1. A polymerization process for producing polymers of low cis 1,4-addition product content which comprises contacting isoprene with a catalyst comprising the reaction product of boron nitride and an alkali metal selected from the group consisting of sodium, potassium, rubidium and cesium formed at a temperature in the range 100–600° C., said reaction product containing 2 to 16 moles of boron nitride per mole of alkali metal, said contacting being carried out at a temperature in the range —20 to 150° C.

2. The process of claim 1 wherein the contacting is carried out in the presence of a liquid hydrocarbon diluent and the catalyst employed is in the range 0.01 to 15 weight percent based on weight of monomers.

3. A process according to claim 1 wherein said alkali metal is potassium.

4. In the catalytic polymerization of conjugated dienes of 4 to 12 carbon atoms under polymerization conditions, the improvement comprising carrying out said polymerization in the presence of the reaction product formed upon admixing boron nitride and an alkali metal selected from the group consisting of sodium, potassium, rubidium, and cesium at a temperature ranging from 100–600° C. as the catalyst component, said reaction product containing from 2 to 16 moles of boron nitride per mole of alkali metal.

5. The process of claim 4 wherein said alkali metal is potassium.

6. The process of claim 4 wherein the contacting is carried out in the presence of a liquid hydrocarbon diluent and the catalyst employed is in the range 0.01 to 15 weight percent based on weight of monomers.

7. A catalyst composition comprising the reaction product formed from boron nitride and an alkali metal selected from the group consisting of sodium, potassium, rubidium and cesium at a temperature in the range 100–600° C., said reaction product containing from 2 to 16 moles of boron nitride per mole of alkali metal.

8. The composition of claim 7 wherein said alkali metal is potassium.

9. The reaction product of claim 7 dispersed in petrolatum.

10. A polymerization process for producing polymers which comprises contacting a conjugated diene of 4 to 12 carbon atoms per molecule at a temperature in the range —20 to 150° C. with a catalyst comprising a boron nitride-alkali metal compound containing from 2 to 16 mols of boron nitride per mol of alkali metal, said boron nitride-alkali metal compound having been formed by bringing together boron nitride and an alkali metal selected from the group consisting of sodium, potassium, rubidium and cesium and heating at a temperature in the range 100 to 600° C. for 10 minutes to 100 hours.

11. A polymerization process for producing polymers which comprises contacting a conjugated diene of 4 to 12 carbon atoms per molecule at a temperature in the range −20 to 150° C. in a liquid hydrocarbon diluent containing 0.01 to 15 weight percent of a catalyst comprising a boron nitride-alkali metal compound containing from 2 to 16 mols boron nitride per mol of alkali metal, said boron nitride-alkali metal compound having been formed by bringing together boron nitride and an alkali metal selected from the group consisting of sodium, potassium, rubidium and cesium and heating at a temperature in the range 100 to 600° C. for 10 minutes to 100 hours, and recovering polymer thus produced.

12. The process of claim 11 wherein said alkali metal is potassium and said conjugated diene is isoprene.

References Cited by the Examiner

Wagner, Paul, and Sam R. Coriell; "Boron Nitride Reacted With Cesium Gas With Some Dielectrics," Review of Scientific Instruments, vol. 30, pp. 937–8 (1959).

JOSEPH L. SCHOFER, *Primary Examiner.*

LEON J. BERCOVITZ, *Examiner.*